Feb. 9, 1954    V. E. GLEASMAN    2,668,417
ROTARY PUMP AND MOTOR TYPE FLUID TRANSMISSION
Filed Feb. 26, 1951    7 Sheets-Sheet 1

Fig. 1

INVENTOR.
Vernon E. Gleasman
BY
ATTORNEYS

Feb. 9, 1954 V. E. GLEASMAN 2,668,417
ROTARY PUMP AND MOTOR TYPE FLUID TRANSMISSION
Filed Feb. 26, 1951 7 Sheets-Sheet 2

Fig. 2

INVENTOR.
Vernon E. Gleasman
BY
Alexander Howell
ATTORNEYS

Feb. 9, 1954 V. E. GLEASMAN 2,668,417
ROTARY PUMP AND MOTOR TYPE FLUID TRANSMISSION
Filed Feb. 26, 1951 7 Sheets-Sheet 4

INVENTOR.
Vernon E. Gleasman
BY
Alexander Nowell
ATTORNEYS

Feb. 9, 1954 V. E. GLEASMAN 2,668,417
ROTARY PUMP AND MOTOR TYPE FLUID TRANSMISSION
Filed Feb. 26, 1951 7 Sheets-Sheet 5

INVENTOR.
Vernon E. Gleasman
BY
Alexander N. Dell
ATTORNEYS

Feb. 9, 1954  V. E. GLEASMAN  2,668,417
ROTARY PUMP AND MOTOR TYPE FLUID TRANSMISSION
Filed Feb. 26, 1951  7 Sheets-Sheet 6

Fig. 10

INVENTOR.
Vernon E. Gleasman
BY
ATTORNEYS

Feb. 9, 1954 V. E. GLEASMAN 2,668,417
ROTARY PUMP AND MOTOR TYPE FLUID TRANSMISSION
Filed Feb. 26, 1951 7 Sheets-Sheet 7

INVENTOR.
BY Vernon E. Gleasman
Alexander H. Dell
ATTORNEYS

Patented Feb. 9, 1954

2,668,417

UNITED STATES PATENT OFFICE 2,668,417

ROTARY PUMP AND MOTOR TYPE FLUID TRANSMISSION

Vernon E. Gleasman, Elmira, N. Y.

Application February 26, 1951, Serial No. 212,739

8 Claims. (Cl. 60—53)

1

This invention is a novel self-contained fluid drive of infinite ratio, and the principal object thereof is to provide a drive of the above type including in one casing a rotary fluid pump, and a rotary fluid motor, with valve means interposed between the outlet of the pump and the inlet of the motor whereby the motor may be driven in either direction, said valve containing pressure-regulating mechanism for initially positioning the vanes of the motor rotor into contact with the inner walls of the motor chamber, said casing being associated with cooling means.

Another object of the invention is to provide a fluid drive of the above type in which the side plates of both the pump and motor are rotatable by and with the ends of their respective pump and motor rotors, and contain annular fluid channels, the rotatable side plates reducing fluid drag and locking tendencies on the side walls of the pump and motor rotors, also by reason of the fact that the annular channels rotate with the rotors, cavitation at the bases of the rotor blades during operation of the unit is avoided by having the fluid in the side walls in constant communication and rotating with the inner ends of the slots for the vanes in the pump and motor rotors.

Another object of the invention is to provide a novel fluid circuit whereby fluid is directed into and out of the ducts of the pump rotor from opposite sides thereof, and at its periphery to avoid cavitation and back pressure, whereby fluid is directed through the valve into either end of the motor rotor at opposite sides to avoid areas of back pressure in the fluid circuit at the entrance ports of the fluid motor.

A further object thereof is to provide a novel construction utilizing a hydraulically balanced motor rotor associated with the above combination.

Another object is to provide efficient cooling means.

Other minor objects of the invention will be hereinafter set forth.

I will explain the invention with reference to the accompanying drawings, which illustrate several practical embodiments thereof, to enable others familiar with the art to adopt and use the same; and will summarize in the claims the novel features of construction, and novel combinations of parts, for which protection is desired.

2

Figure 1:
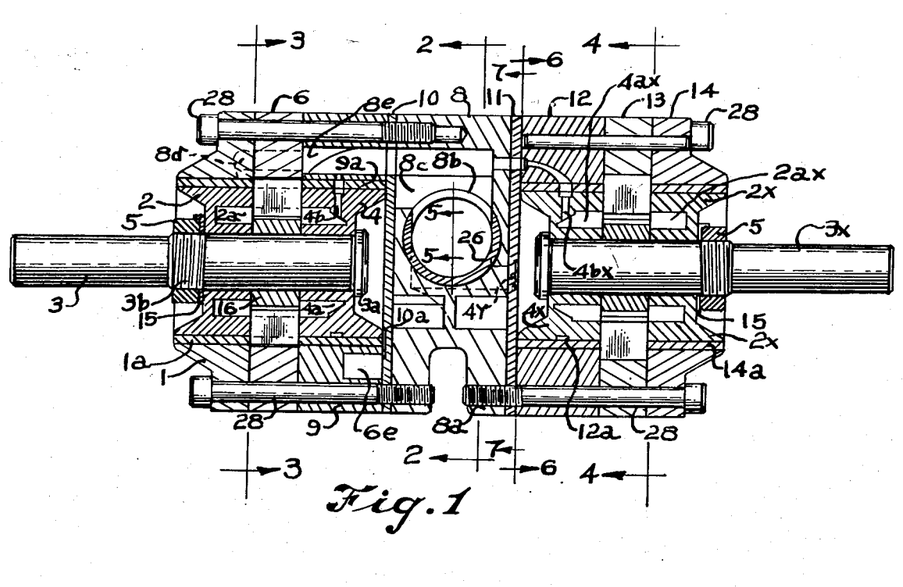
Figure 1 is a longitudinal section through my novel fluid drive, showing the arrangement of the pump, the valve, and the motor, exclusive of the reservoir.

As shown in Fig. 1, the fluid drive consists of a central valve block 8 having a bore for a cylindrical directional control valve 26 contained in the bore and having ports, as hereinafter explained, for controlling the flow of fluid from the pump to the motor, for driving the latter in either forward or reverse directions. Also contained in the control valve 26 is a pressure regulator, hereinafter described, for maintaining sufficient pressure in the motor to project the vane blades from their slots into working engagement with the inner surfaces of the motor chamber, thereby eliminating the necessity of springs.

Figure 2:
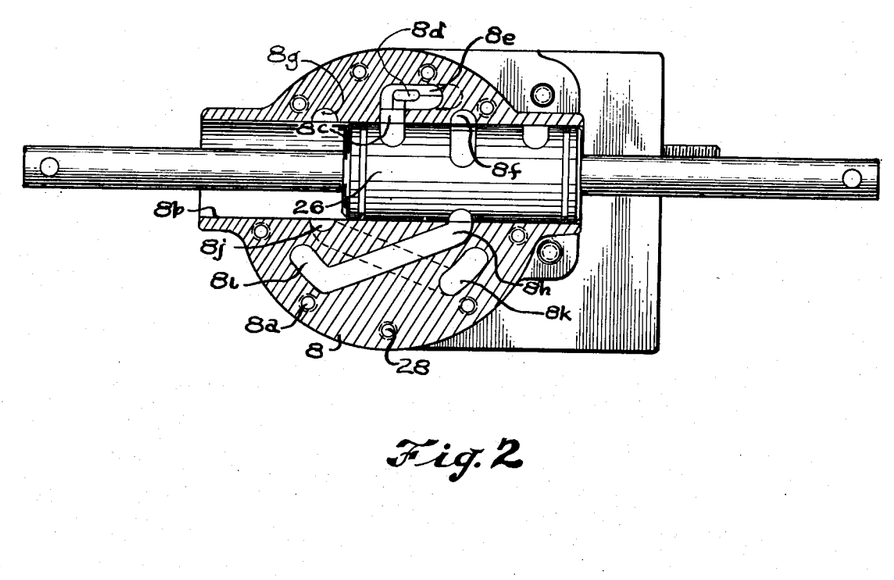
Fig. 2 is a transverse section on the line 2—2, Fig. 1.

As shown in Figs. 1 and 2, the valve block 8 is substantially cylindrical at the motor side but substantially D-shaped at the pump side; and is provided with bores 8a for receiving the bolts 28 which lock the pump unit thereto. In Fig. 2 the bore for the valve 26 is indicated at 8b, the same extending entirely through the block 8; and at the center of the bore 8 at the top thereof is an inlet port 8c, into which fluid from the pump is directed through ports 8d and 8e. At the opposite sides of the inlet port 8c are two ports 8f and 8g (Fig. 2) the port 8f in the forward direction of the motor being an inlet port, and port 8f communicating through the valve 26 with a duct 8h (Fig. 2) which leads through the valve block 8 to a chamber 8i which is disposed opposite one of the inlet ports of the motor unit when the motor is rotating in the forward direction, as hereinafter explained.

When the motor is rotating in the reverse direction, the port $8g$ will serve as an inlet port for the motor, and when the motor is rotating in the forward direction it will serve as an outlet port for the motor.

In Fig. 2 the port $8g$ will communicate through the valve 26 in a certain position of the motor with a port $8j$ in the valve block 8 which is in communication with a port $8k$, with an inlet port of the motor for driving the motor in the reverse direction, as hereinafter explained.

In Fig. 1 the pump unit is shown at the left-hand side of the valve block 8, the same being connected thereto by the cap screws 28 to form a rigid unit therewith.

The pump shown more particularly in Fig. 1 comprises an annular casing 9 having bores therethrough for the reception of the cap bolts 28, the same having in its peripheral portion the ports $8d$ and $8e$ (Fig. 1) and having a central bore of relatively large diameter in which is journaled an annular sleeve $9a$. Contacting the outer face of the side casing 9 is a central casing member 6 (as shown in Figs. 1 and 3) having a bore of special design, hereinafter referred to, in which is mounted the pump rotor 16.

Figure 8:
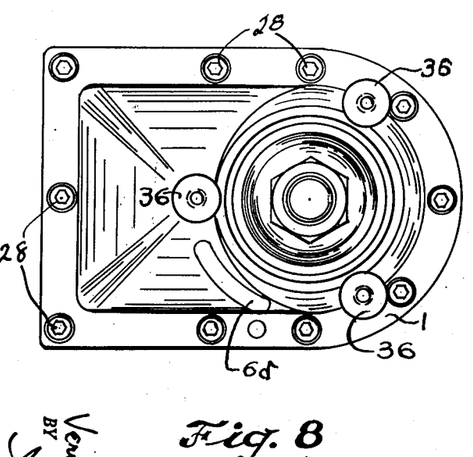
Fig. 8 is an end view of the drive looking at the pump side.

Beyond the central casing member 6 is a side casing 1 (shown in Figs. 1 and 8) having bores therethrough for the reception of the cap bolts 28, the same having a relatively large bore therein in which is journaled a bearing sleeve $1a$.

Figure 3:
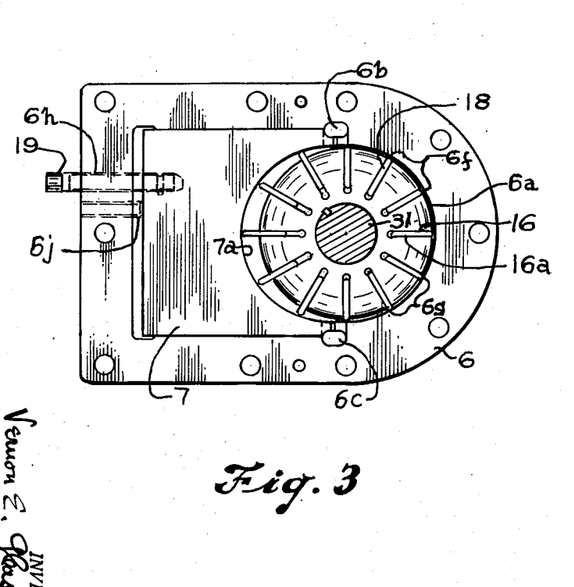
Fig. 3 is a transverse section on the line 3—3, Fig. 1, being taken through the fluid pump.

Within the sleeves $1a$ and $9a$ are hub members 2 and 4, respectively, which make a running fit within the sleeves $1a$ and $9a$, and which support the pump shaft 3 which carries the pump rotor 16, which is keyed thereon, as shown in Fig. 3, the shaft 3 preferably having a head $3a$ on its inner end engaging the inner face of the hub member 4, and having a threaded portion $3b$ receiving a nut 5 and lock washer 15, the latter engaging the outer face of the hub member 2 so that, by tightening the nut 5, the hub members 2 and 4 will be compressed against the sides of the pump rotor 16 and held frictionally engaged therewith.

By the above construction the hub members 2 and 4 are of substantially the same diameter as the pump rotor 16 but are permitted to rotate freely by and with the pump rotor, thus eliminating the side wall drag of the rotor 16 with respect to the side hub walls of the pump casing, and completely eliminating any tendency of locking the rotor 16 in the pump casing by side pressure. The pump shaft 3 may be driven by any suitable prime mover at constant or variable speeds.

As shown in Figs. 1 and 3, the central pump casing 6 is substantially D-shaped, the same being substantially cylindrical at one end and substantially rectangular at the other. The circular portion has a substantially semicylindrical wall $6a$ which makes a close running fit with the periphery of rotor 16.

At the opposite side of rotor 16, and slidable within the rectangular portion of casing 6 (Fig. 3) is a block 7 having an arcuate surface $7a$ similar to the arcuate surface $6a$, but as the same is formed as a part of the block 7, the surface $7a$ is adjustable towards or from the rotor 16, to increase or decrease the volume of pumping chamber, thereby controlling the amount of fluid discharged from the pump which in turn controls the speed of the fluid motor.

In the casing 6 (Fig. 3) at the top thereof is an outlet port $6b$ which communicates with the inner upper end of the pumping chamber and with an inlet port $6c$ (Fig. 3) communicating with the lower end of the pumping chamber, said inlet port $6c$ extending through the casing 6 from one side to the other and being in communication with an inlet port $6d$ (Fig. 8) in the outer member 1 of the pump casing (Fig. 8) and with an inlet duct $6e$ (Fig. 1) in the member 9 at the opposite side of the pump rotor 16, so that fluid is conducted into the inlet port $6c$ from opposite sides of the pump rotor 16 to avoid cavitation. The outlet port $6b$ (Fig. 3) directly communicates with the outlet ports $8d$ and $8e$ (Fig. 5) leading into the valve block 8, hereinbefore referred to.

The rotor 16 (Fig. 3) is provided with a series of radial slots $16a$ receiving radially movable blades 18 which contact at their outer ends the arcuate surface $6a$ of the pump casing 6 and the arcuate surface $7a$ of the slidable block 7 at all times. Said rotor 16 may be nearly hydraulically balanced by bleeding of area $6f$ which is directly opposite to the sump and by directing pressure to area $6g$ which is opposite to the exhaust area.

The ends of the slots $16a$ communicate at each side of the pump motor with an annular slot $2a$ (Fig. 1) in the hub 2 at one side of the pump rotor 16 and with an annular slot $4a$ in the hub 4 at the other side of the pump rotor at all times, in order to actuate and to neutralize the pressure at the bases of the respective blades 18 and the working pressure at their outer tips. Oil at the outlet pressure of the valve block is communicated directly to one of the annular grooves $4a$ by means of a duct $4b$ (Fig. 1), the oil passing through the base of slot $16a$ directly into the other annular groove $2a$. Thus the oil pressure in the annular grooves $2a$ and $4a$ is the same or substantially the same as the pump outlet pressure, and thus the oil behind the blades 18 in the slots $16a$ urges the blades outwardly through the sump area to maintain same in contact with the pump chamber $7a$, the oil pressure being assisted by centrifugal force on the blades when revolved by the prime mover.

The valve block 7 (Fig. 3) may be adjusted towards or from rotor 16 by means of a rod 19 passing through a bore $6h$ at the outlet end of the block 6 and connected at its inner end of the block 7, the rod 19 being controlled manually or automatically in any desired manner.

In Fig. 3 a threaded adjustable abutment $6j$ is shown for preventing the outer face of the block from contacting the adjacent face of the casing 6, thereby limiting the speed of the associated fluid motor.

The fluid motor is disposed at the opposite side of the valve block 8 and consists of an inner side casing member 12, a central annular casing member 13, and an outer side casing member 14, each of which is provided with bores receiving cap screws 28 or the like whereby the motor unit is fixedly secured to the valve casing 8.

The inner motor casing member 12 is provided with a relatively large bore in which is journaled a bushing $12a$, while the outer motor casing member 14 is provided with a relatively large bore in which is journaled a bushing $14a$ similar to the bushings $1a$ and $9a$ of the pump unit. In the bushings $12a$ and $14a$ are journaled heads $4x$ and $2x$ similar in all respects to the head units 4 and 2 of the pump unit, the head units $4x$ and $2x$ carrying a driven shaft $3x$ similar in all respects to the drive shaft 3 of the pump, the parts being identical with the parts 2, 3, 4 of the pump unit hereinbefore described.

Figure 4:
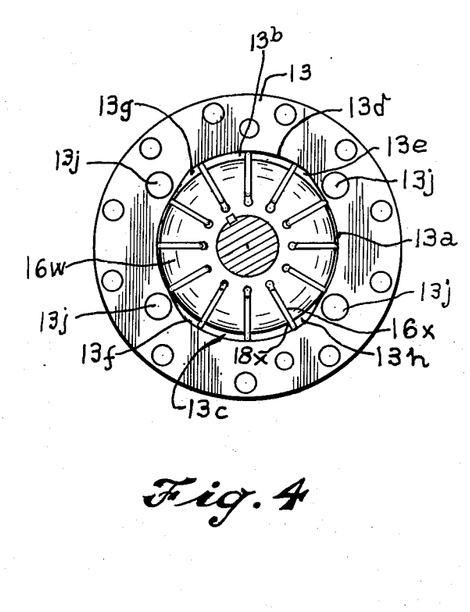
Fig. 4 is a transverse section on the line 4—4, Fig. 1, same being taken through the fluid motor.

The motor shaft $3x$ has fixedly mounted thereon, as shown in Fig. 4, a rotor 16w similar in all respects to the pump rotor 16, the same being provided with slots 16x to carry blades 18x, the heads 4x and 2x being respectively provided with annular grooves 2ax and 4ax, one of which is connected by a duct 4bx with the outlet of the valve block so that the pressure in the annular grooves 4ax and 2ax will be equal to the inlet fluid pressure of the pump. As the above parts are similar in all respects, both as to construction and operation, with the corresponding parts of the pump unit, no further description is necessary herein.

The center motor casing 13 (Fig. 4) is provided with an annular inner wall 13a having diametrically opposed enlargements 13b and 13c therein extending approximately 66° in arcuate length respectively and provided with inlet and outlet ports at each end thereof.

Figure 10:
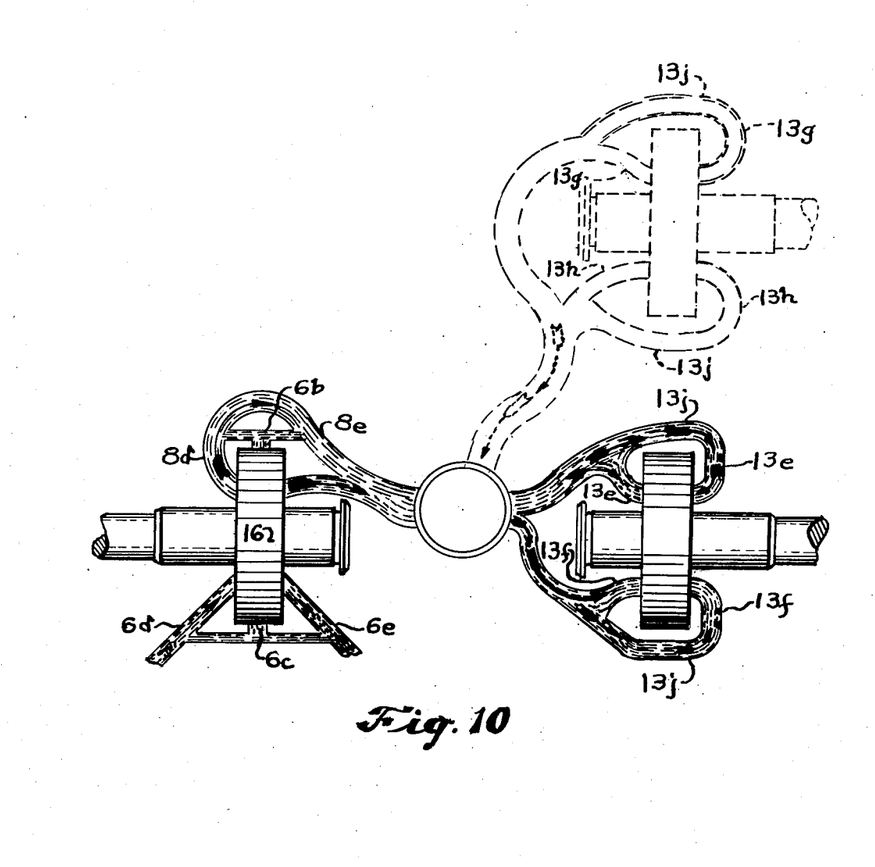
Fig. 10 is a diagrammatic view of my novel fluid circuit.

As shown in Fig. 4, the diametrically opposed inlet ports 13e and 13f are, in the forward direction of the rotor, connected through ducts with the ports 8f and 8i (Fig. 2) of the valve block 8, whereas in the reverse direction of the motor the ports 13g and 13h are connected with the ports 8g and 8k of the valve block 8 (Fig. 2) as shown more particularly in Fig. 10.

In Fig. 4 the ducts 13j connect opposite sides of the ducts 13e, 13f, 13g and 13h, respectively, through the casing member 13, with opposite sides of the pump rotor 16w, so that fluid may be supplied thereto or exhausted from both sides of the pump rotor simultaneously, as indicated in Fig. 10.

Figures 5, 6, 6A, 7:
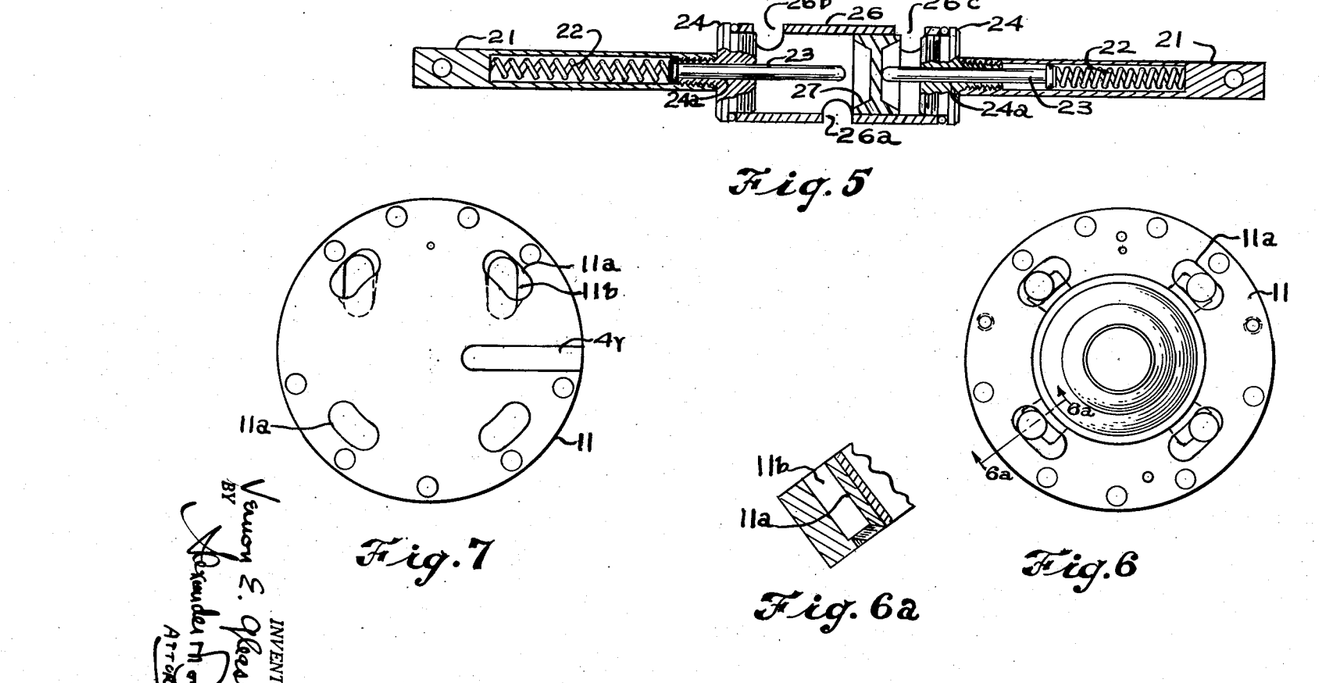
Fig. 5 is a longitudinal section through the valve, shown in Fig. 1.
Fig. 6 is a transverse section on the line 6—6, Fig. 1.
Fig. 6a is a cross section on the line 6a—6a of Fig. 6.
Fig. 7 is a transverse section on the line 7—7, Fig. 1.

In Fig. 7 a separator plate 11 is shown positioned, as in Fig. 1, between the valve block 8 and the motor unit 12, the same being having four ports 11a therein; valve block 8 being chamfered as at 11b so as to register with the openings in the separator plate 11 and inner motor casing. The purpose of the plate 11 is to confine the fluid to certain portions of the interior of the motor casing, said plate 11 also having a bleed-off passage 4y between the valve block and the inner rotor head 4x for the purpose hereinafter described, the radial slot in plate 11 bleeding off the fluid entrapped between the valve block 8 and the inner head 4x to the reservoir.

A similar plate 10 is interposed between the pump unit and the valve block 8, the same being provided with a radial slot 10a which bleeds off the fluid entrapped between the valve block 8 and the inner rotor hub 4 to sump 6e. Fig. 6 shows the rotor plate 12 and the arrangement of slots looking in the direction of the arrows shown in section 6—6, Fig. 1.

As shown in Fig. 5, the valve 26 is cylindrical, the same being threaded at each end and provided with heads 24 at each end, the heads being provided with central cylindrical enlargements upon which are threaded sleeves 21 which are closed at their outer ends. The heads 24 are provided with central bores 24a which slidably receive pins 23 which terminate within the sleeve 26 adjacent the central portion. Pins 23 are provided with heads on their outer ends within the bores of the sleeves 21 and are directly engaged by springs 22 in the bores interposed between the heads of the pins and inner ends of the bores, the springs normally maintaining the pins projected towards the center of the valve 26.

In the valve 26 is a freely slidable piston 27 adapted to be shifted or actuated by pressure within one or the other end of the valve, the piston 27 being of substantial length. In the center of the valve 26 is a port 26a adapted in either extreme right or left position of the valve to register with the port 8j or 8h of the valve block.

Adjacent the ends of the valve 26 are ports 26b and 26c respectively adapted to register in one or other extreme position, right or left, of the valve with the inlet port 8c of the valve 26. The valve is manually or automatically operated to reverse the motor. When the valve is in the position shown in Fig. 2, the port 26b registers with the inlet port 8c of the valve and the port 26a registers with the port 8h; also port 8f is open to port 13e (Figs. 4 and 10) of the valve block 8, while port 26c is blocked off. The fluid pressure entering port 26b into the interior of the sleeve will push the piston 27 into the position shown in Fig. 5, thus uncovering port 26a after the blades 18x of the motor rotor have been shifted radially outwardly into contact with the inner wall of the motor chamber by reason of the passage of fluid through the duct 4bx (Fig. 1) into the annular chambers 4ax and 2ax of the motor hubs, this increase in pressure being occasioned by the resistance of the spring-pressed pin 23 which is engaged by the piston 27 immediately after it leaves its central neutral position in which the piston 27 would normally cover the port 26a. It is obvious that if the valve 26 were shifted to the opposite direction, the port 26c would register with the inlet 8c of the valve block, while port 26a would register with the port 8j of the valve block, and thus the motor rotor would be driven in the opposite direction, the blades 18x of the motor rotor, however, having been first initially forced into contact with the inner walls of the motor chamber. In said reverse position of the valve, the piston 27 would function exactly the same as that previously described except that it would engage the opposite pin 23 and compress its related spring 22 before opening the port 26a, thereby serving the same function as in the forward direction.

Figure 9:
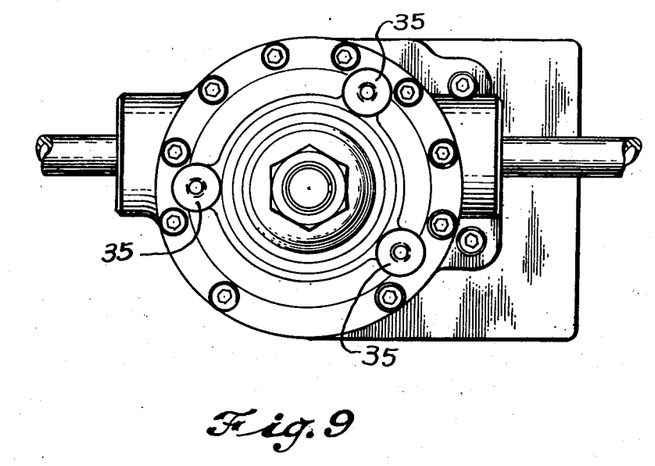
Fig. 9 is an end view of the drive looking at the motor side.
Figure 11:
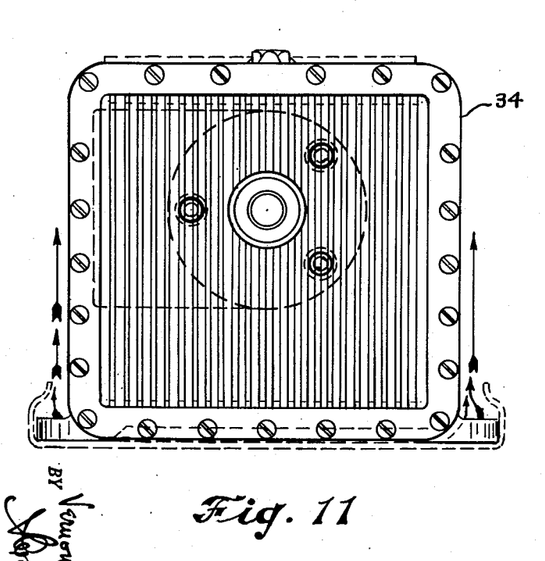
Figs. 11 and 12 are views of the reservoir, and cooling means.
Figure 12:
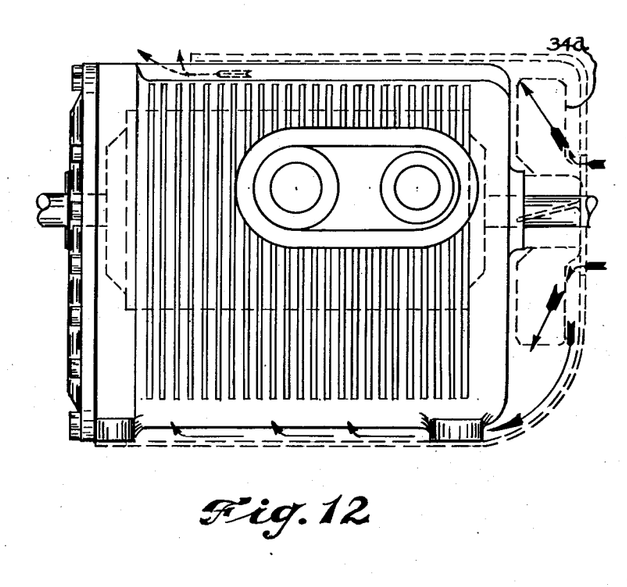

As shown in Figs. 11 and 12, the unit is submerged in an oil reservoir 34 and is suspended by bolts passing through the front and rear of the tank 34 and anchored in bosses 35 (Fig. 9) and 36 (Fig. 8), the above arrangement forming a convenient method of suspending the unit in the tank while permitting ready removal. The suspension of the unit in the tank is a very practical and feasible method of supplying the oil to the pump, and of supplying a sump receiving the discharge of the motor, also for recouping any losses due to seepage of the oil from the internal parts of the unit. It further allows substantial reduction in the cost of the unit due to the fact that there is no question of minor seepage or losses that would be inherent in a system having an external oil supply. My invention also permits the use of a smaller unit. A larger unit would be necessary to incorporate the required seals if the unit were not submerged in a tank or reservoir containing fluid. My invention also provides a more efficient means of dissipating the inherent heat, one form of a cooling means being shown in Fig. 12 which utilizes a fan 34a on the input shaft and brings the entire unit into a state of thermally uniform condition. Fan 34a is shown in dotted lines in Fig. 12.

I do not limit my invention to the exact form shown in the drawings, for obviously changes

I claim:

1. A self-contained fluid drive of infinite ratio, comprising a unit including a fluid pump, a fluid motor, and a valve in a fluid circuit connecting the pump and motor; a pump drive shaft; a driven shaft for the motor; said pump and motor each comprising a central annular casing with side members; rotors for the pump and motor within their respective casings mounted on their respective shafts; said side members having journals therein coaxial with their respective pump and motor shafts; hub members rotatable in said journals and rotatably on their respective shafts; means for contracting the hub members against the sides of their respective rotors; said hub members being of substantially the same diameters as their respective rotors and being freely rotatable with their rotors; the casings each making a running fit with the peripheries of their rotors; inlet and outlet ports for said pump and motor extending to opposite sides of their respective rotors, the outlet ports of the pump discharging into the fluid circuit and the inlet ports of the motor leading from the fluid circuit; said rotors having series of radial slots; radially movable blades in said slots adapted to engage the inner walls of the pump and motor; said hub members having annular slots in their faces adjacent the rotors and communicating with the ends of the blade slots; ducts for directing fluid under pressure of the fluid circuit into one of the annular slots of the pump and motor hub members to force the blades outwardly of the rotor slots; and said valve being operable to effect reversal of the motor rotor; said motor annular member having opposed walls making a close running fit with the periphery of the motor rotor with intermediate opposed enlargements provided at the respective ends thereof with said ports; the ports of the motor being diametrically interconnected with the valve, whereby reversal of the motor is effected by the setting of the valve; said valve being hollow and cylindrical and being provided with heads at both ends and having externally axial extensions; sleeves extending from said extensions closed at their outer ends; pins in said sleeve slidable in bores in said extensions with their inner ends terminating within said cylinder; heads on the outer ends of said pins within said sleeves; compressed springs interposed between the outer ends of the pins and the closed ends of the respective sleeves; a piston in said valve cylinder intermediate and normally spaced from the inner ends of the pins; and ports at the center and ends of the valve cylinder communicating with ports of the valve, whereby when the valve is in one extreme position the rotor will be rotated in one direction, and when in the other extreme position the motor rotor will be rotated in the opposite direction, the added pressure produced by the springs increasing the fluid pressure under the motor blades to initially position the blades of the motor rotor into contact with the walls of the motor chamber.

2. In a drive as set forth in claim 1, separator plates disposed between the valve, the motor, and the pump, said plates having openings therein adapted to register with the ducts of the fluid circuit; said plates having bleed-off passages therein for fluid entrapped between the valve casing and the adjacent side members of the pump and motor.

3. A self-contained fluid drive of infinite ratio, comprising a unit including a fluid pump, a fluid motor, and a valve in a fluid circuit connecting the pump and motor; a pump drive shaft; a driven shaft for the motor; said pump and motor each comprising a central annular casing with side members; rotors for the pump and motor within their respective casings mounted on their respective shafts; said side members having journals therein coaxial with their respective pump and motor shafts; hub members rotatable in said journals and rotatably on their respective shafts; means for contracting the hub members against the sides of their respective rotors; said hub members being of substantially the same diameters as their respective rotors and being freely rotatable with their rotors; the casings each making a running fit with the peripheries of their rotors; inlet and outlet ports for said pump and motor extending to opposite sides of their respective rotors, the outlet ports of the pump discharging into the fluid circuit and the inlet ports of the motor leading from the fluid circuit; said rotors having series of radial slots; radially movable blades in said slots adapted to engage the inner walls of the pump and motor; said hub members having annular slots in their faces adjacent the rotors and communicating with the ends of the blade slots; ducts for directing fluid under pressure of the fluid circuit into one of the annular slots of the pump and motor hub members to force the blades outwardly of the rotor slots; said valve being operable to effect reversal of the motor rotor; and pressure responsive means associated with the valve for automatically positioning the vanes of the motor rotor into contact with the inner walls of the motor before pressure fluid is applied to the motor.

4. In a drive as set forth in claim 3, a reservoir containing fluid, and said unit being submerged in said reservoir, said reservoir supplying fluid to the pump and receiving the fluid discharged from the motor, said reservoir thereby serving as a cooling means and for recouping losses due to seepage of fluid from the internal parts of the pump, motor, and valve; and means for circulating the fluid in said reservoir.

5. In a drive as set forth in claim 3, the annular casing of the pump being D-shaped with its semicircular wall making a close running fit with the periphery of the pump rotor; a slidable block in the D-shaped casing having an arcuate surface opposite the semi-circular wall of the casing; means for shifting the block towards or from the rotor to vary the volume of the pumping chamber formed between the pump rotor and arcuate surface; the inlet and outlet ports for said chamber being disposed at the ends of the semi-cylindrical wall; and adjustable means for limiting the outward movement of the block to thereby limit the speed of the fluid motor.

6. In a drive as set forth in claim 3, said motor annular member having opposed walls making a close running fit with the periphery of the motor rotor with intermediate opposed enlargements provided at the respective ends thereof with said ports; the ports of the motor being diametrically inter-connected with the valve; whereby reversal of the motor is effected by the setting of the valve.

7. In a drive as set forth in claim 6, said valve being hollow and cylindrical and being provided with heads at both ends having externally axial extensions; sleeves extending from said extensions closed at their outer ends; pins in said sleeves slidable in bores in said extensions with their inner ends terminating within said cylinder; heads on the outer ends of said pins within said sleeves; compressed springs interposed between the outer ends of the pins and the closed ends of the respective sleeves; a piston in said valve cylinder intermediate and normally spaced from the inner ends of the pins; and ports at the center and ends of the valve cylinder communicating with ports of the valve, whereby when the valve is in one extreme position the rotor will be rotated in one direction, and when in the other extreme position the motor rotor will be rotated in the opposite direction, the added pressure produced by the springs increasing the fluid pressure under the motor blades to initially position the blades of the motor rotor into contact with the walls of the motor chamber.

8. In a drive as set forth in claim 7, separator plates disposed between the valve, the motor, and the pump, said plates having openings therein adapted to register with the ducts of the fluid circuit; said plates having bleed-off passages therein for fluid entrapped between the valve casing and the adjacent side members of the pump and motor.

VERNON E. GLEASMAN.

References Cited in the file of this patent

UNITED STATES PATENTS

| Number | Name | Date |
|---|---|---|
| 995,117 | Coleman | June 13, 1911 |
| 1,203,745 | Kilgore | Nov. 7, 1916 |
| 1,527,685 | Huwiler | Feb. 24, 1925 |
| 1,789,785 | Steiner et al. | Jan. 20, 1931 |
| 1,999,288 | Fjellstedt | Apr. 30, 1935 |
| 2,330,565 | Eckart | Sept. 28, 1943 |
| 2,417,218 | Segsworth | Mar. 11, 1947 |

FOREIGN PATENTS

| Number | Country | Date |
|---|---|---|
| 426,861 | Great Britain | Apr. 10, 1935 |